(12) United States Patent
Wu et al.

(10) Patent No.: US 11,768,329 B2
(45) Date of Patent: Sep. 26, 2023

(54) HIGH ISOLATION OPTICAL SPLITTER

(71) Applicant: II-VI Delaware, Inc, Wilmington, DE (US)

(72) Inventors: Yuping Wu, Fuzhou (CN); Peng Xiao, Fuzhou (CN); Danping We, Fuzhou (CN)

(73) Assignee: II-VI DELAWARE, INC, Wilmington, DE (US)

( * ) Notice: Subject to any disclaimer, the term of this patent is extended or adjusted under 35 U.S.C. 154(b) by 0 days.

(21) Appl. No.: 17/248,221

(22) Filed: Jan. 14, 2021

(65) Prior Publication Data
US 2021/0231873 A1   Jul. 29, 2021

(30) Foreign Application Priority Data

Jan. 16, 2020  (CN) .......................... 202010047495.9
Jan. 16, 2020  (CN) .......................... 202020093995.1

(51) Int. Cl.
*G02B 6/27*       (2006.01)
*H04J 14/02*      (2006.01)
*G02B 6/12*       (2006.01)

(52) U.S. Cl.
CPC .......... *G02B 6/2746* (2013.01); *G02B 6/274* (2013.01); *G02B 6/2706* (2013.01); *H04J 14/02* (2013.01); *G02B 2006/1215* (2013.01)

(58) Field of Classification Search
CPC .......... G02B 6/00; G02B 5/00; G02B 6/2706; G02B 6/274; G02B 6/2746; G02B 2006/1215; H04J 14/02
See application file for complete search history.

(56) References Cited

U.S. PATENT DOCUMENTS

| | | | | |
|---|---|---|---|---|
| 5,033,830 A | * | 7/1991 | Jameson | G02B 6/2746 359/489.08 |
| 5,594,821 A | * | 1/1997 | Cheng | G02B 6/2937 385/27 |
| 5,737,104 A | * | 4/1998 | Lee | G02B 6/29362 398/79 |
| 5,880,875 A | * | 3/1999 | Kim | G02B 6/2746 359/349 |

(Continued)

FOREIGN PATENT DOCUMENTS

| | | | | |
|---|---|---|---|---|
| JP | 09318913 A | * | 12/1997 | .............. G02B 27/28 |
| WO | WO-2006042449 A1 | * | 4/2006 | .............. G02B 6/241 |

*Primary Examiner* — Daniel Petkovsek
(74) *Attorney, Agent, or Firm* — Blank Rome LLP

(57) ABSTRACT

A device includes an integrated structure of an input fiber, a first output fiber, an input splitting/combining device, a first output splitting/combining device, an input rotation device, a first output rotation device, a first lens, an isolator core, a second lens, a second output rotation device, a second output splitting/combining device, and a second output fiber. With the integrated structure, the device integrates functions of an optical isolator and an optical splitter. As an optical splitter, input of an optical signal into the input fiber are distributed to the two output fibers for output. As an optical splitter, the device can isolate light in opposite directions and can reduce damage to a light source at the input. In a system, the device can replace two conventional optical isolators and optical splitters and effectively reduce space, simplify the assembly process, and facilitate miniaturization and integration for systems.

23 Claims, 10 Drawing Sheets

(56) References Cited

U.S. PATENT DOCUMENTS

| | | | | |
|---|---|---|---|---|
| 5,909,310 | A * | 6/1999 | Li | G02F 1/093 |
| | | | | 359/489.08 |
| 6,049,426 | A * | 4/2000 | Xie | G02B 6/272 |
| | | | | 385/11 |
| 6,226,115 | B1 * | 5/2001 | Shirasaki | G02F 1/093 |
| | | | | 385/11 |
| 6,317,250 | B1 * | 11/2001 | Guan | G02F 1/093 |
| | | | | 385/11 |
| 6,480,331 | B1 * | 11/2002 | Cao | G02F 1/093 |
| | | | | 359/489.05 |
| 6,580,558 | B2 * | 6/2003 | Zhu | G02B 5/3083 |
| | | | | 385/55 |
| 6,826,323 | B2 * | 11/2004 | Konishi | G02B 6/2746 |
| | | | | 385/11 |
| 6,839,170 | B2 * | 1/2005 | Li | G02B 6/2746 |
| | | | | 359/489.08 |
| 6,954,307 | B2 * | 10/2005 | Shao | G02B 6/2746 |
| | | | | 359/489.08 |
| 7,715,664 | B1 * | 5/2010 | Shou | G02B 6/4208 |
| | | | | 385/11 |
| 9,696,485 | B2 * | 7/2017 | Mao | G02B 6/2746 |

* cited by examiner

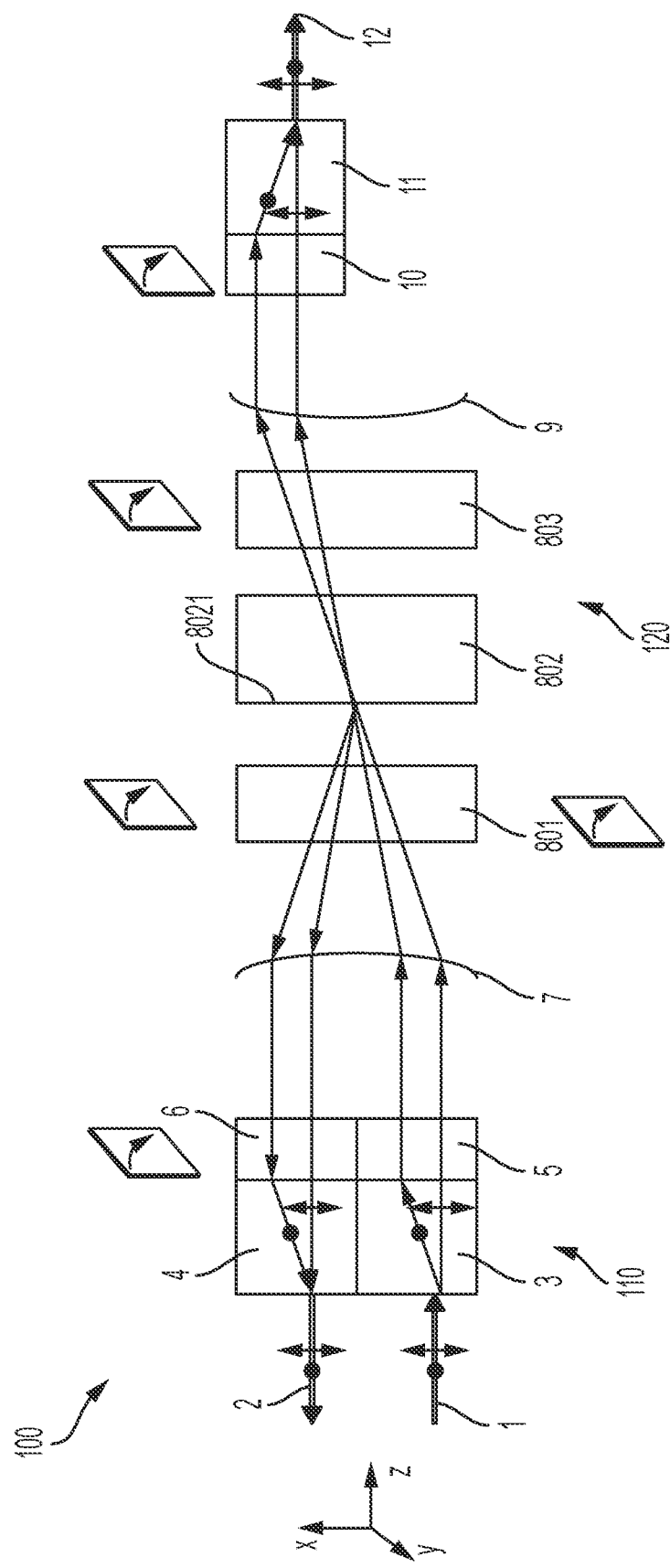

HIGH ISOLATION OPTICAL SPLITTER

CROSS-REFERENCE TO RELATED APPLICATIONS

The present invention claims priority to Chinese patent application 202010047495.9, filed Jan. 16, 2020 and Chinese patent application number 202020093995.1, filed Jan. 16, 2020, which are each incorporated by reference herein in their entirety.

TECHNICAL FIELD

The present disclosure relates to the field of optical fiber communications, and in particular, to a high isolation optical splitter used in an optical amplifier system.

BACKGROUND OF THE INVENTION

In an optical fiber communication system, due to its property of one-way transmission, an optical isolator can effectively reduce the interference to a laser source caused by reverse light on a transmission line, can mitigate the deterioration of system transmission performance, can lower the probability at which the gain of an optical amplifier changes and auto-excitation is caused, can maintain the operating stability of the laser, and can extend the service life of the laser. Therefore, optical isolators are important passive optical devices that have been extensively used in optical fiber communication systems.

An optical splitter is another type of passive optical device that can distribute an optical signal from one link into a plurality of links. And the optical splitter has also been extensively used in optical fiber communication systems. In fact, an optical isolator and an optical splitter are often combined together for use in an optical amplifier system and are used for reverse light isolation and optical power splitting after signal amplification.

Conventionally, the optical isolator and the optical splitter used in an optical amplifier system are two independent devices, which, when used together, require large assembly space, high assembly cost, and leads to certain assembly risk.

SUMMARY OF THE INVENTION

Considering the situation of the prior art, the subject matter of the present disclosure provides a high isolation optical splitter as a unitary device that integrates the functions of optical isolation and optical splitting.

According to the present disclosure, an optical device for an optical beam comprises an input, a first output, a second output, and an intermediate assembly. The input for the optical beam has: an input splitting/combining (i.e., birefringent) device, and an input rotation device optically coupled to the input birefringent device. The first output for a first portion of the optical beam has: a first output splitting/combining (i.e., birefringent) device, and a first output rotation device optically coupled to the first output birefringent device. The second output for a second portion of the optical beam having: a second output splitting/combining birefringent) device, and a second output rotation device optically coupled to the second output birefringent device. The intermediate assembly has: a first intermediate rotation device optically coupled to the input rotation device and the first output rotation device, a second intermediate rotation device optically coupled to the second output rotation device, and a splitter optically coupled between the first and second intermediate rotation devices.

According to the present disclosure, a high isolation optical splitter comprises an input optical fiber, a first output optical fiber, an input splitting/combining (i.e., birefringent) device, a first output splitting/combining (i.e., birefringent) device, an input optical rotation device, a first output optical rotation device, a first lens, an isolator core, a second lens, a second output optical rotation device, a second output splitting/combining (i.e., birefringent) device, and a second output optical fiber that are sequentially arranged. The input splitting/combining (i.e., birefringent) device and the input optical rotation device correspond to the input optical fiber and are sequentially arranged between an end face of the input optical fiber (close to the first lens) and the first lens. The first output splitting/combining (i.e., birefringent) device and the first output optical rotation device correspond to the first output optical fiber and are sequentially arranged between an end face of the first output optical fiber (close to the first lens) and the first lens, and the second output splitting/combining (i.e., birefringent) device and the second output optical rotation device correspond to the second output optical fiber and are sequentially arranged between an end face of the second output optical fiber (close to the second lens) and the second lens.

In addition, the isolator core comprises a first Faraday rotator, an optical splitting sheet, a second Faraday rotator, and a magnetic ring fitting over the first Faraday rotator, the optical splitting sheet, and the second Faraday rotator. Each of the first Faraday rotator, the optical splitting sheet, and the second Faraday rotator are sequentially arranged, and opening ends at both ends of the magnetic ring oppose the first lens and the second lens, respectively.

When an incident beam is input from the input optical fiber, the beam passes the optical splitting sheet in the isolator core to produce split light (i.e., reflected light and transmitted light). The reflected light is output from the first output optical fiber, and the transmitted light is output from the second output optical fiber. When the incident beam is input from the first output optical fiber, beams on the input optical fiber and the second output optical fiber are isolated. When the incident beam is input from the second output optical fiber, beams on the input optical fiber and the first output optical fiber are isolated.

As a possible implementation, furthermore, the first output optical fiber and the input optical fiber are combined into a dual-fiber optical fiber head structure, and the first output optical fiber and the input optical fiber are symmetric with respect to a virtual central axis of the dual-optical fiber head. The second output optical fiber and the first output optical fiber are both located at the same side of the virtual central axis.

Preferably, the second output optical fiber is one optical fiber of a second dual-fiber optical fiber head, and the hole pitch between this second dual-fiber optical fiber head and the first dual-fiber optical fiber head formed by the first output optical fiber and the input optical fiber is consistent.

Furthermore, the input splitting/combining (i.e., birefringent) device and the input optical rotation device correspond to the input optical fiber and are sequentially arranged on an end face of the input optical fiber close to the first lens. The first output splitting/combining (i.e., birefringent) device and the first output optical rotation device correspond to the first output optical fiber and are sequentially arranged on an end face of the first output optical fiber close to the first lens, and the second output splitting/combining device and the second output optical rotation device correspond to the second output optical fiber and are sequentially arranged on an end surface of the second output optical fiber close to the second lens. In short, the input splitting/combining device is fixed on the input optical fiber, and the input optical rotation device is fixed on the input splitting/combining device. The first output splitting/combining device is fixed on the first output optical fiber, and the first output optical rotation device is fixed on the first output splitting/combining device. The second output splitting/combining device is fixed on the second output optical fiber, and the second output optical rotation device is fixed on the second output splitting/combining device.

Optionally, the input splitting/combining device, the first output splitting/combining device, and the second output splitting/combining device have the same dimensions.

Furthermore, the splitting/combining devices are a displacement-type birefringent crystal and used for splitting/combining the o-light (i.e., ordinary ray) and the e-light (i.e., extraordinary ray) inside the crystal. As expected, the o-light behaves according to Snell's law while the e-light does not. The optical axis of the birefringent crystal intersects obliquely with a surface of the crystal at an angle of 45-degrees; and the splitting direction of the o-light and the e-light is perpendicular to the beam propagation direction and is parallel to the direction of relative displacement between the input optical fiber and the output optical fibers.

Furthermore, when optical axis directions of the input splitting/combining device and the first output splitting/combining device are parallel to each other, the optical rotation angle realized by a combination of the input optical rotation device, the first output optical rotation device, and the first Faraday rotator is 90 degrees. When optical axis directions of the input splitting/combining device and the first output splitting/combining device are perpendicular to each other, the optical rotation angle realized by the combination of the input optical rotation device, the first output optical rotation device, and the first Faraday rotator is 0 degree. When optical axis directions of the input splitting/combining device and the second output splitting/combining device are parallel to each other, the optical rotation angle realized by a combination of the input optical rotation device, the second output optical rotation device, and the second Faraday rotator is 0 degree. When optical axis directions of the input splitting/combining device and the second output splitting/combining device are parallel to each other, the optical rotation angle realized by the combination of the input optical rotation device, the second output optical rotation device, and the second Faraday rotator is 90 degrees.

Furthermore, the optical rotation devices are a type of ½ wavelength (λ) phase delay-type crystalline quartz waveplates used for rotating a polarization direction of a linear polarized light; a combination of the input optical rotation device and the first output optical rotation device realizes an optical rotation angle of 45 degrees, and a combination of the input optical rotation device and the second output optical rotation device also realizes an optical rotation angle of 45 degrees.

Optionally, the input optical rotation device, the first output optical rotation device, and the second output optical rotation device have the same, or substantially the same, dimensions.

Furthermore, the first lens and the second lens can be C lenses or other lens forms having focal planes on two sides used for focalizing and collimating a light beam. The input optical fiber and the first output optical fiber are located on one focal plane of the first lens, and the optical splitting face of the optical splitting sheet is located on another focal plane of the first lens. The second output optical fiber is located on one focal plane of the second lens, and the optical splitting face of the optical splitting sheet is located on another focal plane of the second lens.

Optionally, collimating light spots of the first lens and the second lens are consistent.

Optionally, the first lens and the second lens have the same, or substantially the same, dimensions and materials.

Furthermore, the first Faraday rotator and the second Faraday rotator are a type of magneto-optical crystals having a rotation angle of 22.5 degrees for a polarization direction of a linear polarized light.

Optionally, the first Faraday rotator and the second Faraday rotator have the same, or substantially the same, dimensions.

Furthermore, the magnetic ring is a permanent magnet used for providing a saturated magnetic field strength of the magneto-optical crystals, causing the magneto-optical crystals to realize fixed rotation of the polarization direction of the linear polarized light; and the magnetic field direction is parallel to the light propagation direction.

Optionally, when the linear polarized light incomes from the N pole of the magnetic field, the polarization direction is rotated clockwise; and when the linear polarized light incomes from the S pole of the magnetic field, the polarization direction is rotated counterclockwise.

Furthermore, the optical splitting sheet is a glass sheet having a certain thickness, and the optical splitting face is coated with an optical power splitting film or an optical wavelength splitting WDM film.

By adopting the above-described technical solution, the present disclosure achieves the following advantageous effects compared with the prior art: by adopting an integrated structure design, the present disclosure realizes the integration of functions of an optical isolator and an optical splitter in one device, which reduces the assembly space, lowers the assembly difficulty, simplifies the assembly process, and facilitates the development of miniaturized and integrated applications of the system.

BRIEF DESCRIPTION OF THE DRAWINGS

The subject matter of the present disclosure will be further described below in combination with the accompanying drawings and specific embodiments:

FIG. 5 is a schematic diagram of a forward light path for the first embodiment of the high isolation optical splitter according to the present disclosure;

DETAILED DESCRIPTION OF THE INVENTION

Embodiment 1

Figure 1:
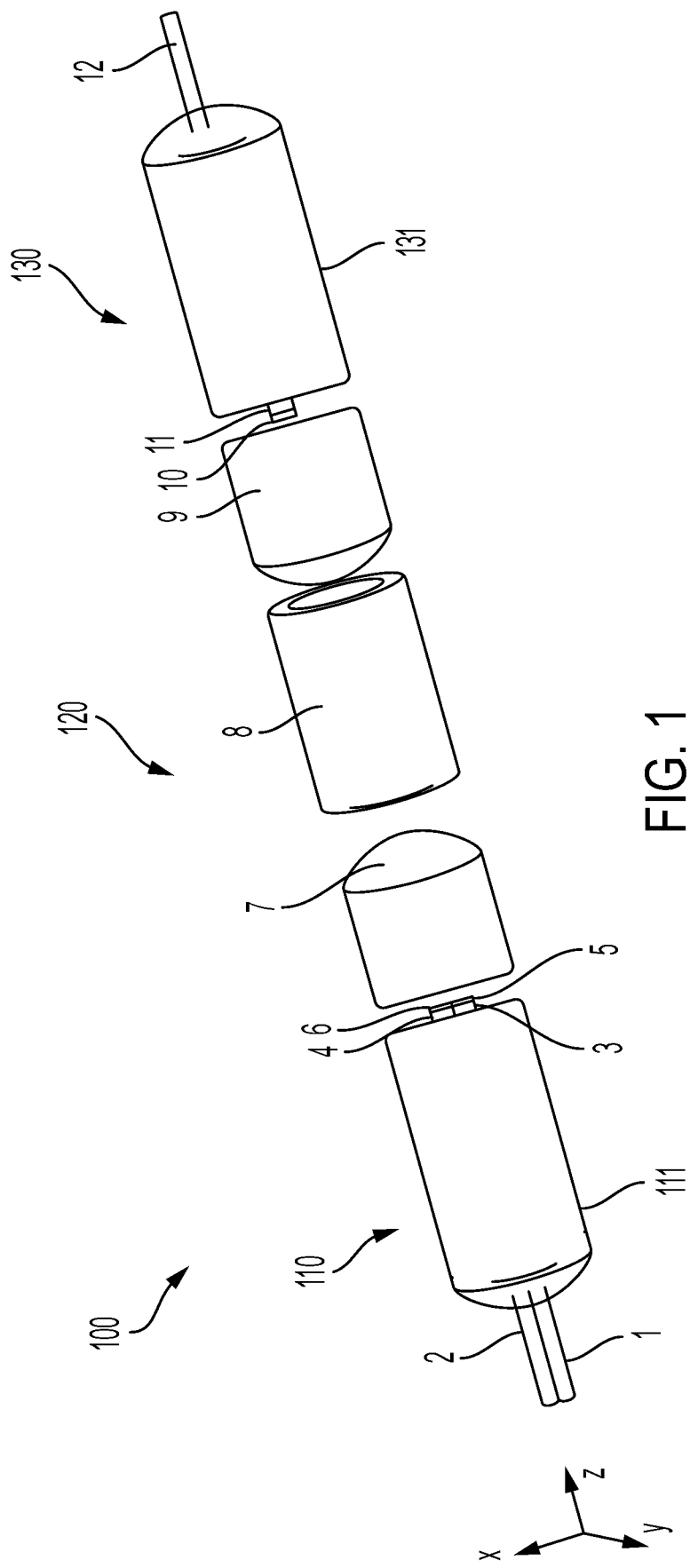
FIG. 1 is a perspective view of a high isolation optical splitter according to the present disclosure having a reflection end assembly, a first lens, an isolator core, a second lens, and a transmission end assembly.

As shown in FIG. 1, a high isolation optical splitter device 100 according to the present disclosure includes a reflection end assembly 110, an intermediate assembly 120, and a transmission end assembly 130. The reflection end assembly 110 has an input optical fiber 1, a first output optical fiber 2, an input splitting/combining device 3, a first output splitting/combining device 4, an input optical rotation device 5, a first output optical rotation device 6. The splitting/combining devices 3, 4 are birefringent devices. The intermediate assembly 120 includes a first lens 7, an isolator core 8, and a second lens 9 disposed between the reflection end assembly 110 and the transmission end assembly 130. For its part, the transmission end assembly 130 includes a second output optical rotation device 10, a second output splitting/combining device 11, and a second output optical fiber 12.

Figure 2:
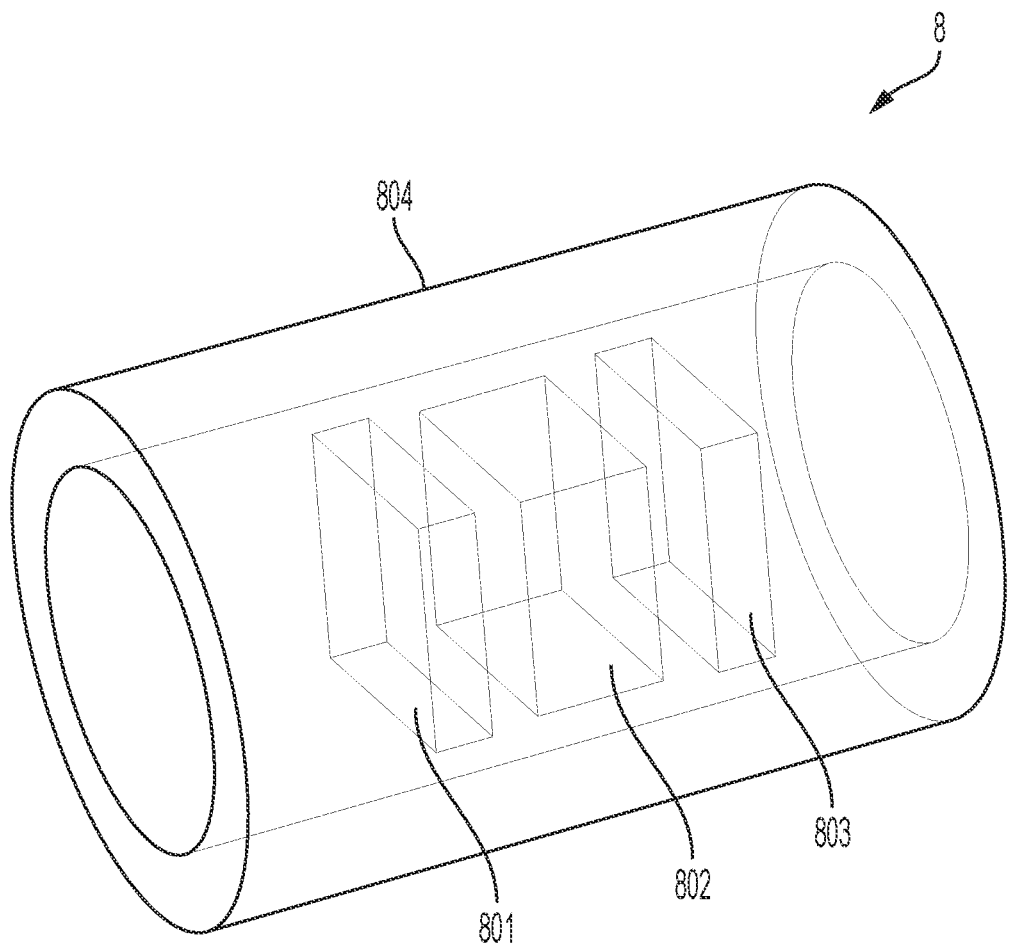
FIG. 2 is a perspective view of the isolator core of the disclosed high isolation optical splitter.

As shown in FIG. 2, the isolator core 8 comprises a first Faraday rotator 801, an optical splitting sheet 802, a second Faraday rotator 803, and a magnetic ring 804 that are sequentially arranged.

The arrangement disclosed below with respect to FIGS. 1, 2, 3A-3B, 4A-4B, 5, and 6 covers a first embodiment of the high isolation optical splitter device 100. This first embodiment includes a particular configuration of elements, which are described in more detail below.

Looking first at the first embodiment of the device 100 in general, the high isolation optical splitter device 100 can be used for routing incident beams incident on the various fibers 1, 2, 12. Overall, the routing involves splitting/combining (i.e., birefringence), rotating, reflecting and transmitting light of the incident beams in order to split an optical beam at the input to first and second outputs and to isolate any indicate optical beam at either of the first and second outputs from the input and the other output.

When an incident beam is input from the input optical fiber 1, for example, the beam passes through the reflection end assembly and the lens 7 and then passes through the optical splitting sheet 802 in the isolator core 8 to produce split light. Any reflected light passes back through the lens 7 and the reflection end assembly 110 to be output from the first output optical fiber 2. By contrast, transmitted light passes from the isolator core 8, through the lens 9, and the transmission end assembly 130 to be output from the second output optical fiber 12. When the incident beam is input from the first output optical fiber 2, however, beams on the input optical fiber 1 and the second output optical fiber 12 are isolated. When the incident beam is input from the second output optical fiber 12, beams on the input optical fiber 1 and the first output optical fiber 2 are likewise isolated.

As shown in FIG. 1, the first output optical fiber 2 and the input optical fiber 1 are combined into a dual-fiber optical fiber head 111 and are located at the same side of the device. The second output optical fiber 12 is located at the other side of the device. The first output optical fiber 2 and the input optical fiber 1 are symmetric with respect to a central axis (e.g., Z-axis) of the dual-optical fiber head 111. The second output optical fiber 12 is located at a different side of the central axis (Z-axis) of the device from the side where the input optical fiber 1 is located. Moreover, the second output optical fiber 12 is located at the same side of the central axis (Z-axis) of the device as the first output optical fiber 1.

Figure 3A:
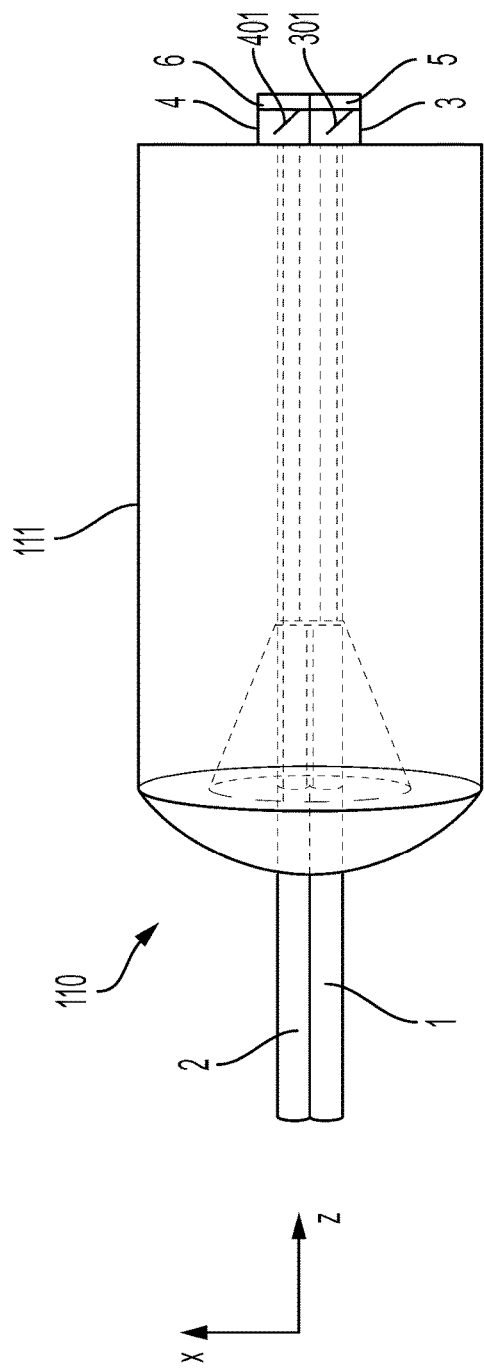
FIGS. 3A-3B illustrate side and end views of a first embodiment for a reflection end assembly of the disclosed high isolation optical splitter.
Figure 3B:
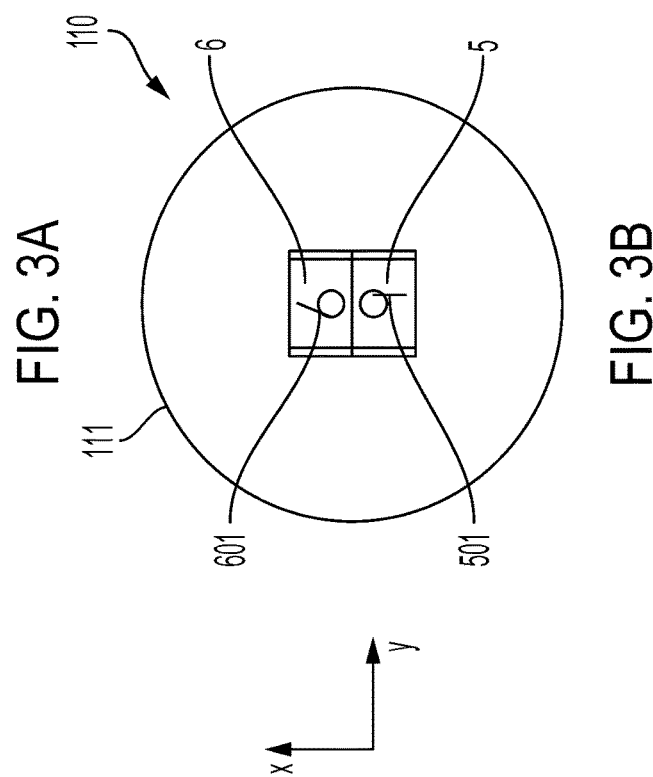
Figure 4A:
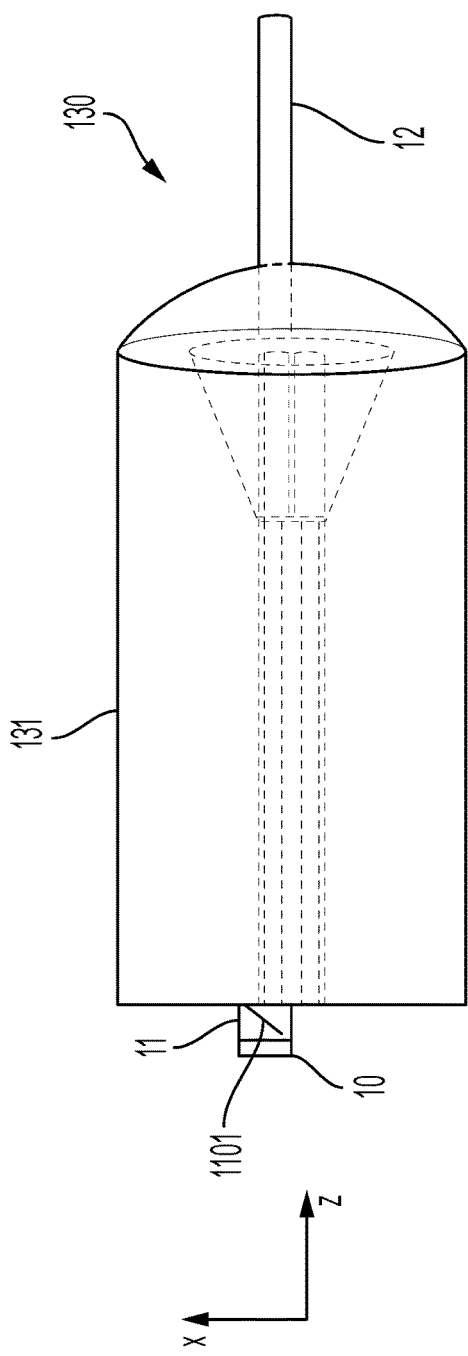
FIGS. 4A-4B illustrate side and end views of a first embodiment for a transmission end assembly of the disclosed high isolation optical splitter.
Figure 4B:
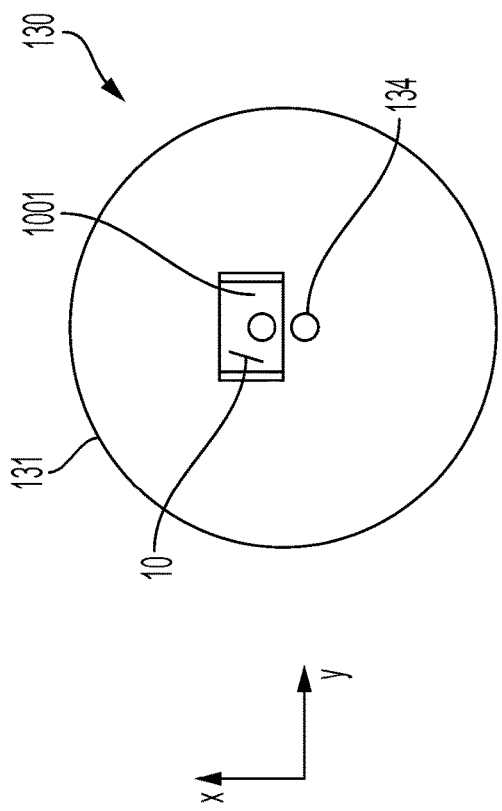

As shown in FIGS. 3A-3B, the input splitting/combining device 3 is fixed on the input optical fiber 1 in the dual-fiber optical fiber head 111, and the input optical rotation device 5 is fixed on the input splitting/combining device 3. The first output splitting/combining device 4 is fixed on the first output optical fiber 2 in the dual-fiber optical fiber head 111, and the first output optical rotation device 6 is fixed on the first output splitting/combining device 4. As shown in FIGS. 4A-4B, the second output splitting/combining device 11 is fixed on the second output optical fiber 12 in the dual-fiber optical fiber head 131, and the second output optical rotation device 10 is fixed on the second output splitting/combining device 11. The dual-fiber head 131 has a pitched hole 132.

The splitting/combining devices 3, 4, and 11 are a displacement-type birefringent crystal and are used for splitting/combining the o-light and the e-light inside the crystal. Optical axes 301, 401, and 1101 corresponding thereto in a one-to-one manner intersect obliquely with a surface of the crystals at an angle of 45 degrees. The splitting direction of the o-light and the e-light is perpendicular to the beam propagation direction and is parallel to the direction of relative displacement between the input optical fiber and the output optical fibers. The optical rotation devices 5, 6, and 10 are a type of ½ wavelength (λ) phase delay-type crystalline quartz waveplates used for rotating a polarization direction of a linear polarized light. An optical axis 501 in FIGS. 3A-3B of the input optical rotation device 5 is parallel to the crystal surface and rotates the polarization direction at the X-axis, the Y-axis, and 45 degrees by an angle of 0 degree. Another optical axis 601 in FIGS. 3A-3B of the first output optical rotation device 6 intersects obliquely with the crystal surface, forms an angle of 22.5 degrees with the x-axis, and rotates the polarization direction at the X-axis, the Y-axis, and 45 degrees by an angle of 45 degrees. Yet another optical axis 1001 in FIGS. 4A-4B of the second output optical rotation device 10 intersects obliquely with the crystal surface, forms an angle of 22.5 degrees with the X-axis, and rotates the polarization direction at the X-axis, the Y-axis, and 45 degrees by an angle of 45 degrees.

As shown in FIG. 1 and FIG. 5, the first lens 7 and the second lens 9 are a type of C-lenses used for focalizing and collimating a light beam. The optical splitting sheet 802 is a glass sheet having a certain thickness, and the optical splitting face 8021 is coated with a optical power splitting film so the incident beam is reflected and transmitted at a certain ratio. The input optical fiber 1 and the first output optical fiber 2 are located on one focal plane of the first lens 7, and the optical splitting face 8021 of the optical splitting sheet 802 is located on another focal plane of the first lens. The second output optical fiber 12 is located on one focal plane of the second lens 9, and the optical splitting face 8021 of the optical splitting sheet 802 is located on another focal plane of the second lens.

As shown in FIG. 2 and FIG. 5, the first Faraday rotator 801 and the second Faraday rotator 803 are a type of magneto-optical crystals having a rotation angle of 22.5 degrees for a polarization direction of a linear polarized light. The magnetic ring 804 is a permanent magnet used for providing a saturated magnetic field strength of the magneto-optical crystals, causing the magneto-optical crystals to realize fixed rotation of the polarization direction of the linear polarized light; and the magnetic field direction is parallel to the light propagation direction. When the linear polarized light incomes from the N pole of the magnetic field, the polarization direction is rotated clockwise; and when the linear polarized light incomes from the S pole of the magnetic field, the polarization direction is rotated counterclockwise.

As shown in FIG. 5, the forward light path realized by the device is as follows. An incident beam is input from the input optical fiber 1 along the z-axis direction, and the beam passes the input splitting/combining device 3 to cause the splitting of two linear polarized light beams, the o-light (i.e., ordinary ray) and the e-light (i.e., extraordinary ray), on the X-direction, and the polarization directions of the o-light and the e-light are the X-direction and the Y-direction, respectively. The two linear polarized light beams in the X-direction and the y-direction pass the input optical rotation device 5 with no optical rotation. Entering the first lens 7 and incoming from the N pole to the first Faraday rotator 801, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The reflected light is reflected back to the first Faraday rotator 801, the polarization direction is rotated clockwise by 22.5 degrees again, and the light incomes, via the first lens 7, to the first output optical rotation device 6 and is rotated clockwise by 45 degrees, the total optical rotation angle of the linear polarized light being 90 degrees at this point. Because the optical axis directions of the first output splitting/combining device 4 and the input splitting/combining device 3 are parallel to each other, the two linear polarized light beams are combined when entering the first output splitting/combining device 4, which finally reaches the first output optical fiber 2 for outputting. The transmitted light is transmitted to the second Faraday rotator 803, the polarization direction is rotated clockwise by 22.5 degrees, and the light incomes, via the second lens 9, to the second output optical rotation device 10 and is rotated clockwise by 45 degrees, where the total optical rotation angle of the linear polarized light being 90 degrees at this point. Because optical axis directions of the second output splitting/combining device 11 and the input splitting/combining device 3 are perpendicular to each other, the two linear polarized light beams are combined when entering the second output splitting/combining device 11, which finally reaches the second output optical fiber 12 for outputting.

Figure 6:
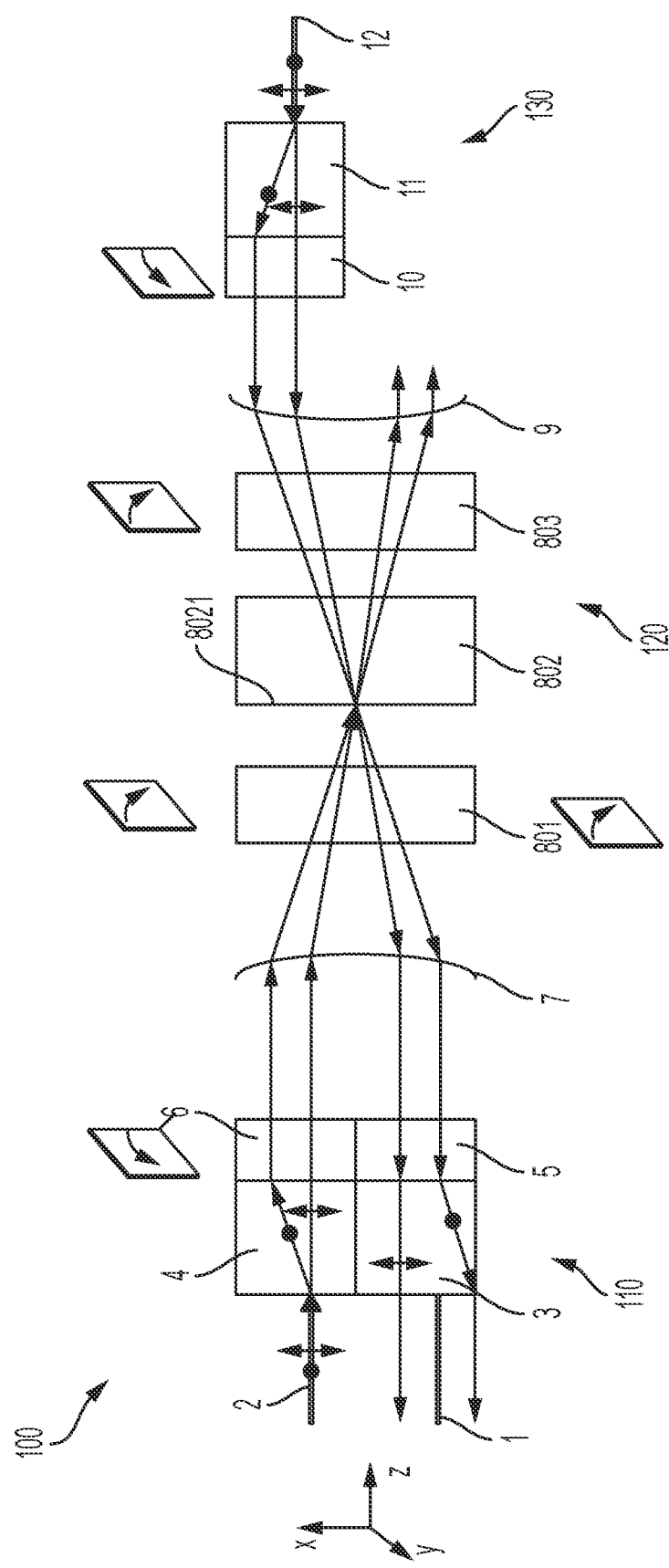
FIG. 6 is a schematic diagram of a backward light path for the first embodiment of the high isolation optical splitter according to the present disclosure.

As shown in FIG. 6, the backward light path realized by the device is as follows. An incident beam is input from the first output optical fiber 2 along the z-axis direction. The beam passes the first output splitting/combining device 4 to cause the splitting of two linear polarized light beams, the o-light and the e-light, on the X-direction, and the polarization directions of the o-light and the e-light are the X-direction and the Y-direction, respectively. The two linear polarized light beams in the x direction and the y direction pass the first output optical rotation device 6 with optical rotation, and the polarization directions of the two linear polarized light beams are rotated counterclockwise by 45 degrees, respectively. Entering the first lens 7 and incoming from the N pole to the first Faraday rotator 801, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The reflected light is reflected back to the first Faraday rotator 801, the polarization direction is rotated clockwise by 22.5 degrees again, and the light incomes via the first lens 7 to the input optical rotation device 5 with no optical rotation, where the total optical rotation angle of the linear polarized light being 0 degree at this point. Because optical axis directions of the first output splitting/combining device 4 and the input splitting/combining device 3 are parallel to each other, the two linear polarized light beams are not combined when entering the input splitting/combining device 3, and the input optical fiber 1 has no light to output. The transmitted light sequentially passes the second Faraday rotator 803 and the second lens 9, and the outgoing direction deviates from the second output optical fiber 12, that is, the second output optical fiber 12 has no light to output.

An incident beam is input from the second output optical fiber 12 along the Z-axis direction, and the beam passes the second output splitting/combining device 11 to cause the splitting of two linear polarized light beams, the o-light and the e-light, on the x-direction, and the polarization directions of the o light and the e-light are the x-direction and the y-direction, respectively. The two linear polarized light beams in the x-direction and the y-direction pass the second output optical rotation device 10 with optical rotation, and the polarization directions of the two linear polarized light beams are rotated counterclockwise by 45 degrees, respectively. Entering the second lens 9 and incoming from the N pole to the second Faraday rotator 803, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The transmitted light is transmitted to the first Faraday rotator 801, the polarization direction is rotated clockwise by 22.5 degrees again, and the light incomes via the first lens 7 to the input optical rotation device 5 with no optical rotation, where the total optical rotation angle of the linear polarized light being 0 degree at this point. Because optical axis directions of the second output splitting/combining device 11 and the input splitting/combining device 3 are perpendicular to each other, the two linear polarized light beams are not combined when entering the input splitting/combining device 3, and the input optical fiber 1 has no light to output. The reflected light sequentially passes the second Faraday rotator 803 and the second lens 9, and the outgoing direction deviates from the first output optical fiber 2, that is, the first output optical fiber 2 has no light to output.

Embodiment 2

As noted, the arrangement disclosed above covers a first embodiment of the high isolation optical splitter device 100 having the reflection end assembly 110, the intermediate assembly 120, and the transmission end assembly 130. This first embodiment included a particular configuration of elements. A second embodiment is disclosed below with respect to FIGS. 1, 2, 7A-7B, 8A-8B, 9 and 10. Overall, this second embodiment is similar to the first embodiment so that like references numerals and description are provided. The second embodiment differs in optical angles 1002 and 1102 in the transmission end assembly 130.

As before in FIG. 1 and FIG. 2, the high isolation optical splitter device 100 of this second embodiment has the reflection end assembly 110, the intermediate assembly 120, and the transmission end assembly 130. The reflection end assembly 110 has an input optical fiber 1, a first output optical fiber 2, an input splitting/combining device 3, a first output splitting/combining device 4, an input optical rotation device 5, a first output optical rotation device 6. The intermediate assembly 120 has the first lens 7, the isolator core 8, and the second lens 9, which are disposed between the reflection end assembly 110 and the transmission end assembly 130. For its part, the transmission end assembly 130 includes a second output optical rotation device 10, a second output splitting/combining device 11, and a second output optical fiber 12.

As before in FIG. 2, the isolator core 8 comprises a first Faraday rotator 801, an optical splitting sheet 802, a second Faraday rotator 803, and a magnetic ring 804 that are sequentially arranged.

When an incident beam is input from the input optical fiber 1, the beam passes through the reflection end assembly and the lens 7 and then passes through the optical splitting sheet 802 in the isolator core 8 to produce split light. Any reflected light passes back through the lens 7 and the reflection end assembly to be output from the first output optical fiber 2. By contrast, the transmitted light passes from the isolator core 8, through the lens 9, and the transmission end assembly to be output from the second output optical fiber 12. When the incident beam is input from the first output optical fiber 2, beams on the input optical fiber 1 and the second output optical fiber 12 are isolated. When the incident beam is input from the second output optical fiber 12, beams on the input optical fiber 1 and the first output optical fiber 2 are isolated.

As again shown in FIG. 1, the first output optical fiber 2 and the input optical fiber 1 are combined into a dual-fiber optical fiber head 111 and are located at the same side of the device. The second output optical fiber 12 is located at the other side of the device. The first output optical fiber 2 and the input optical fiber 1 are symmetric with respect to a central axis (e.g., Z-axis) of the dual-optical fiber head 111. The second output optical fiber 12 is located at a different side of the central axis of the device from the side where the input optical fiber 1 is at and is located at the same side of the central axis of the device as the first output optical fiber 1.

Figure 7A:
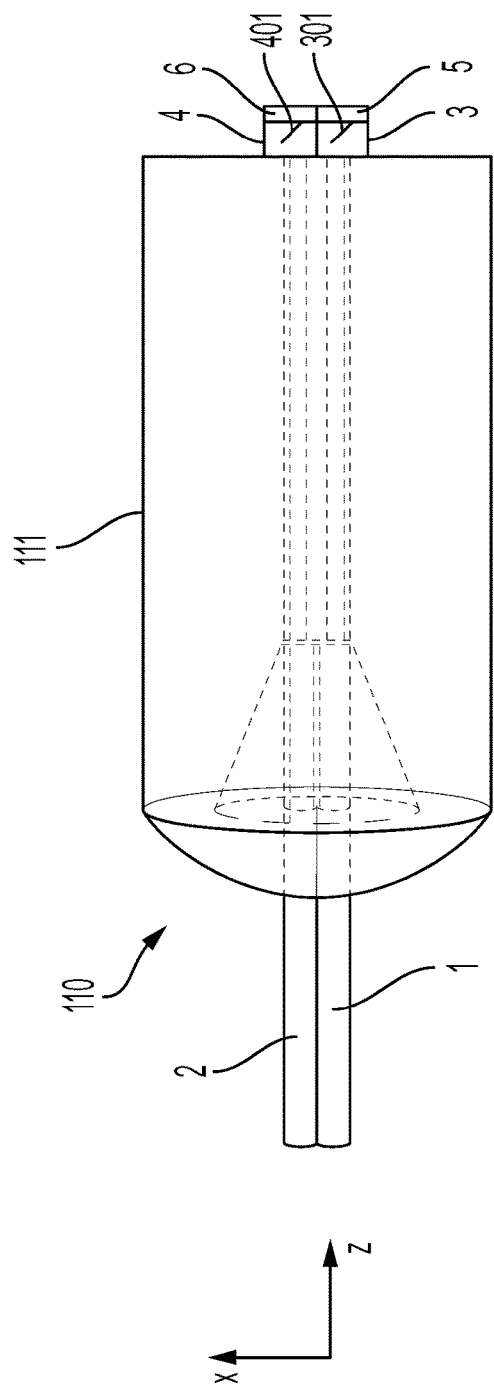
FIGS. 7A-7B illustrate side and end views of a second embodiment of a reflection end assembly for the high isolation optical splitter according to the present disclosure.
Figure 7B:
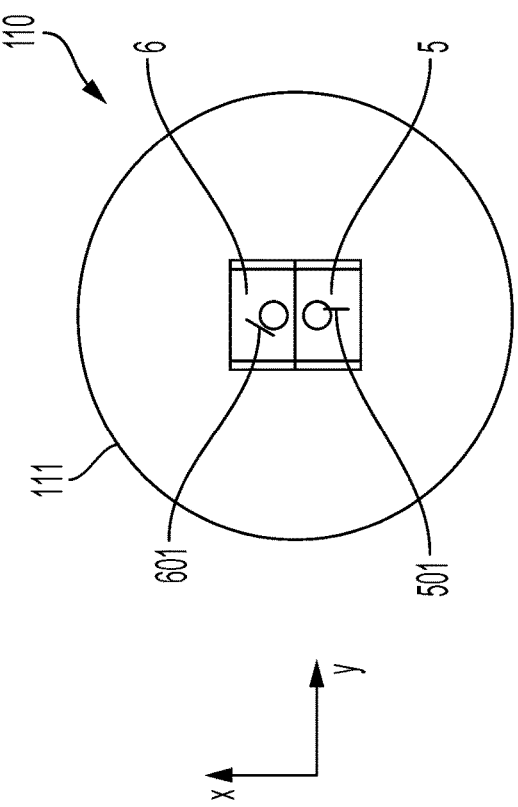
Figure 8A:
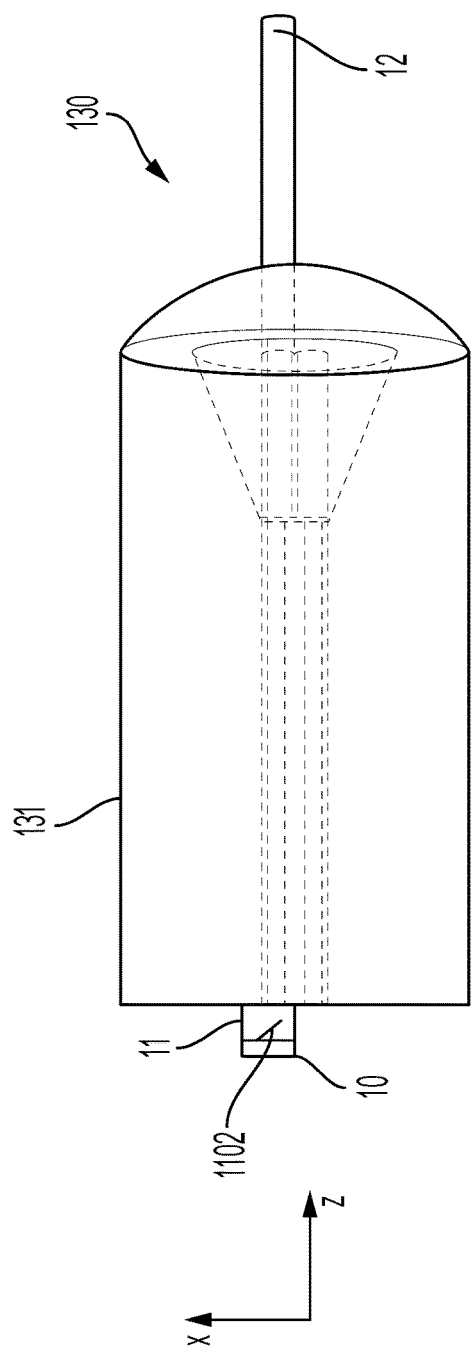
FIGS. 8A-8B illustrates side and end views of a second embodiment of a transmission end assembly for the high isolation optical splitter according to the present disclosure.
Figure 8B:
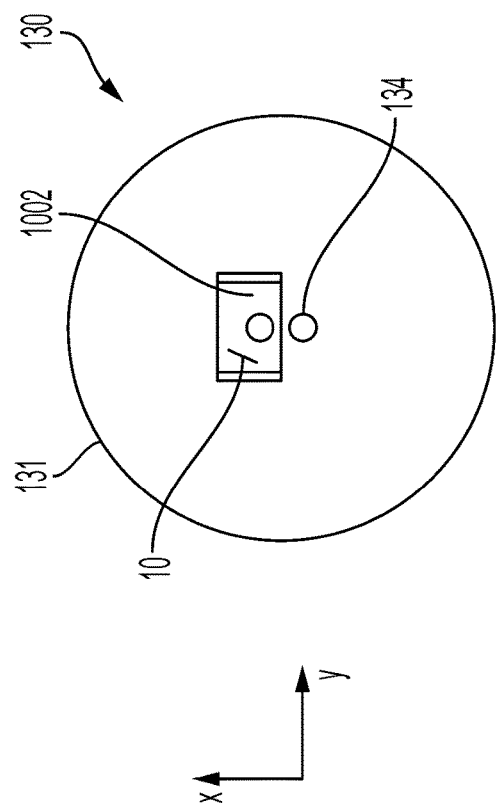

As shown in FIGS. 7A-7B, the input splitting/combining device 3 is fixed on the input optical fiber 1 in the dual-fiber optical fiber head 111, and the input optical rotation device 5 is fixed on the input splitting/combining device 3; the first output splitting/combining device 4 is fixed on the first output optical fiber 2 in the dual-fiber optical fiber head 111, and the first output optical rotation device 6 is fixed on the first output splitting/combining device 4. As shown in FIGS. 8A-8B, the second output splitting/combining device 11 is fixed on the second output optical fiber 12 in the dual-fiber optical fiber head 131, and the second output optical rotation device 10 is fixed on the second output splitting/combining device 11. The dual-fiber head 131 has a pitched hole 132.

The splitting/combining devices 3, 4, and 11 are a displacement-type birefringent crystal and used for splitting/combining the o-light and the e-light inside the crystal. Optical axes 301, 401, and 1102 corresponding thereto in a one-to-one manner intersect obliquely with a surface of the crystals at an angle of 45 degrees. The splitting direction of the o-light and the e-light is perpendicular to the beam propagation direction and is parallel to the direction of relative displacement between the input optical fiber and the output optical fibers. The optical rotation devices 5, 6, and 10 are a type of ½ wavelength (λ) phase delay-type crystalline quartz waveplates used for rotating a polarization direction of a linear polarized light. An optical axis 501 in FIGS. 7A-7B of the input optical rotation device 5 is parallel to the crystal surface and rotates the polarization direction at the x-axis, the y-axis, and 45 degrees by an angle of 0 degree. Another optical axis 601 in FIGS. 7A-7B of the first output optical rotation device 6 intersects obliquely with the crystal surface, forms an angle of 22.5 degrees with the x-axis, and rotates the polarization direction at the x axis, the y-axis, and 45 degrees by an angle of 45 degrees. An optical axis 1002 in FIGS. 8A-8B of the second output optical rotation device 10 intersects obliquely with the crystal surface, forms an angle of 22.5 degrees with the X-axis, and rotates the polarization direction at the X-axis, the Y-axis, and 45 degrees by an angle of 45 degrees.

Figure 9:
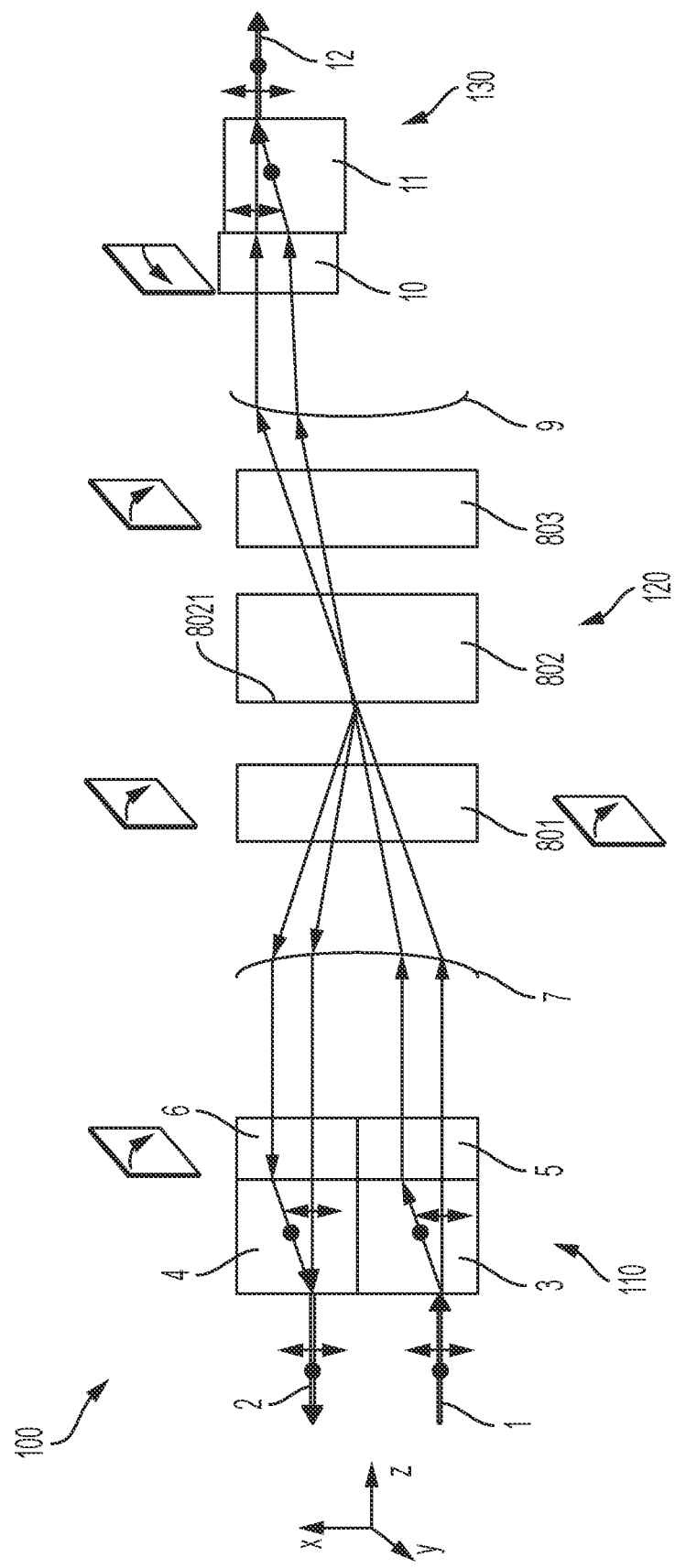
FIG. 9 is a schematic diagram of a forward light path for the second embodiment of the high isolation optical splitter according to the present disclosure.

As again shown in FIG. 1 and FIG. 9, the first lens 7 and the second lens 9 are a type of C-lenses used for focalizing and collimating a light beam. The optical splitting sheet 802 is a glass sheet having a certain thickness, and the optical splitting face 8021 is coated with an optical power splitting film so the incident beam is reflected and transmitted at a certain ratio. The input optical fiber 1 and the first output optical fiber 2 are located on one focal plane of the first lens 7, and the optical splitting face 8021 of the optical splitting sheet 802 is located on another focal plane of the first lens. The second output optical fiber 12 is located on one focal plane of the second lens 9, and the optical splitting face 8021 of the optical splitting sheet 802 is located on another focal plane of the second lens.

As shown in FIG. 2 and FIG. 9, the first Faraday rotator 801 and the second Faraday rotator 803 are a type of magneto-optical crystals having a rotation angle of 22.5 degrees for a polarization direction of a linear polarized light. The magnetic ring 804 is a permanent magnet used for providing a saturated magnetic field strength of the magneto-optical crystals, causing the magneto-optical crystals to realize fixed rotation of the polarization direction of the linear polarized light; and the magnetic field direction is parallel to the light propagation direction. When the linear polarized light incomes from the N pole of the magnetic field, the polarization direction is rotated clockwise; and when the linear polarized light incomes from the S pole of the magnetic field, the polarization direction is rotated counterclockwise.

As shown in FIG. 9, the forward light path realized by the device is as follows. An incident beam is input from the input optical fiber 1 along the z-axis direction, the beam passes the input splitting/combining device 3 to cause the splitting of two linear and polarized light beams, the o-light and the e-light, on the x-direction, and the polarization directions of the o-light and the e-light are the x-direction and the y direction, respectively. The two linear polarized light beams in the x direction and the y direction pass the input optical rotation device 5 with no optical rotation. Entering the first lens 7 and incoming from the N pole to the first Faraday rotator 801, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The reflected light is reflected back to the first Faraday rotator 801, the polarization direction is rotated clockwise by 22.5 degrees again, and the light incomes via the first lens 7 to the first output optical rotation device 6 and is rotated clockwise by 45 degrees, where the total optical rotation angle of the linear polarized light being 90 degrees at this point. Because optical axis directions of the first output splitting/combining device 4 and the input splitting/combining device 3 are parallel to each other, the two linear polarized light beams are combined when entering the first output splitting/combining device 4, which finally reaches the first output optical fiber 2 for outputting. The transmitted light is transmitted to the second Faraday rotator 803, the polarization direction is rotated clockwise by 22.5 degrees, and the light incomes, via the second lens 9, to the second output optical rotation device 10 and is rotated counterclockwise by 45 degrees, where the total optical rotation angle of the linear polarized light being 0 degree at this point. Because optical axis directions of the second output splitting/combining device 11 and the input splitting/combining device 3 are parallel to each other, the two linear polarized light beams are combined when entering the second output splitting/combining device 11, which finally reaches the second output optical fiber 12 for outputting.

Figure 10:
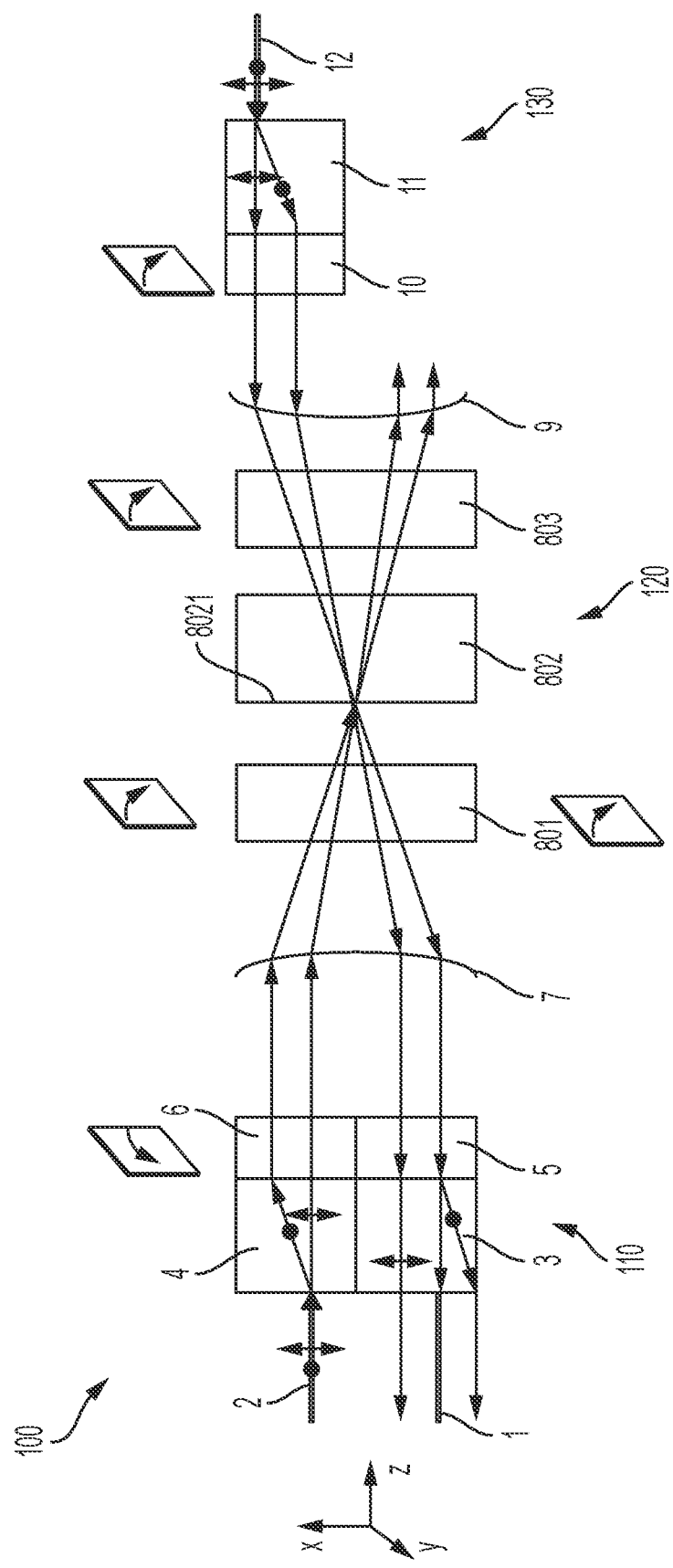
FIG. 10 is a schematic diagram of a backward light path for the second embodiment of the high isolation optical splitter according to the present disclosure.

As shown in FIG. 10, the backward light path realized by the device is as follows. An incident beam is input from the first output optical fiber 2 along the z-axis direction. The beam passes the first output splitting/combining device 4 to cause the splitting of two linear polarized light beams, the o-light and the e-light, on the x-direction, and the polarization directions of the o light and the e light are the x-direction and the y direction, respectively; the two linear polarized light beams in the x direction and the y direction pass the first output optical rotation device 6 with optical rotation, and the polarization directions of the two linear polarized light beams are rotated counterclockwise by 45 degrees, respectively. Entering the first lens 7 and incoming from the N pole to the first Faraday rotator 801, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The reflected light is reflected back to the first Faraday rotator 801, the polarization direction is rotated clockwise by 22.5 degrees again, and the light incomes via the first lens 7 to the input optical rotation device 5 with no optical rotation, where the total optical rotation angle of the linear polarized light being 0 degree at this point. Because optical axis directions of the first output splitting/combining device 4 and the input splitting/combining device 3 are parallel to each other, the two linear polarized light beams are not combined when entering the input splitting/combining device 3, and the input optical fiber 1 has no light to output. The transmitted light sequentially passes the second Faraday rotator 803 and the second lens 9, and the outgoing direction deviates from the second output optical fiber 12, that is, the second output optical fiber 12 has no light to output.

An incident beam is input from the second output optical fiber 12 along the z-axis direction, and the beam passes the second output splitting/combining device 11 to cause the splitting of two linear polarized light beams, the o-light and the e-light, on the x-direction, and the polarization directions of the o-light and the e-light are the x-direction and the y-direction, respectively; the two linear polarized light beams in the x-direction and the y-direction pass the second output optical rotation device 10 with optical rotation, and the polarization directions of the two linear polarized light beams are rotated clockwise by 45 degrees, respectively. Entering the second lens 9 and incoming from the N pole to the second Faraday rotator 803, the two linear polarized light beams have the polarization directions thereof rotated clockwise by 22.5 degrees, respectively, and are focused onto the optical splitting face 8021 of the optical splitting sheet 802. A part of the light is reflected, and a part of the light is transmitted. The transmitted light is transmitted to the first Faraday rotator 801, the polarization direction is rotated clockwise by 22.5 degrees again, and the light incomes via the first lens 7 to the input optical rotation device 5 with no optical rotation, where the total optical rotation angle of the linear polarized light being 90 degrees at this point. Because optical axis directions of the second output splitting/combining device 11 and the input splitting/combining device 3 are parallel to each other, the two linear polarized light beams are not combined when entering the input splitting/combining device 3, and the input optical fiber 1 has no light to output. The reflected light sequentially passes the second Faraday rotator 803 and the second lens 9, and the outgoing direction deviates from the first output optical fiber 2, that is, the first output optical fiber 2 has no light to output.

It should be noted that variations and modifications to the embodiments disclosed herein are possible. To those of ordinary skills in the art, various replacement and equivalent components of the embodiments are known. Those of ordinary skills in the art should be aware that various modifications made to the form and details of the present disclosure without departing from the spirit and range of the present disclosure defined by the appended claims shall all fall within the protection scope of the present disclosure.

What is claimed is:

1. An optical device for an optical beam, the device comprising:

an input having: an input birefringent device, and an input rotation device optically coupled to the input birefringent device;

a first output/input having: a first output birefringent device, and a first output rotation device optically coupled to the first output birefringent device;

a second output/input having: a second output birefringent device, and a second output rotation device optically coupled to the second output birefringent device; and an intermediate assembly having: a first intermediate rotation device optically coupled to the input rotation device and the first output rotation device, a second intermediate rotation device optically coupled to the second output rotation device, and a splitter optically coupled between the first and second intermediate rotation devices, wherein the input is configured to propagate light of the optical beam, incident at the input, to the intermediate assembly; the splitter is configured to reflect a reflected light portion to the first output/input and is configured to propagate a transmitted light portion to the second output/input; the first output/input is configured to output the reflected light portion; and the second output/input is configured to output the transmitted light portion;

wherein the first output/input is configured to propagate a first reverse light of the optical beam, incident at the first output/input, to the intermediate assembly; the splitter is configured to reflect a first reverse light portion to the input; and the input is configured to isolate the first reverse light portion; and wherein the second output/input is configured to propagate a second reverse light of the optical beam, incident at the second output/input, to the intermediate assembly; the splitter is configured to propagate a second reverse light portion to the input; and the input is configured to isolate the second reverse light portion.

2. The device of claim 1, wherein each of the birefringent devices is configured to displace extraordinary light (e-light) relative to ordinary light (o-light) of the optical beam incident thereto.

3. The device of claim 1, wherein each of the rotation devices is configured to rotate polarized light of the optical beam incident thereto.

4. The device of claim 1, wherein the first intermediate rotation device comprises a first Faraday rotator; wherein the splitter comprises an optical splitting sheet; wherein the second intermediate rotation device comprises a second Faraday rotator; wherein the first Faraday rotator and the second Faraday rotator each comprise a magneto-optical crystal; and wherein the intermediate assembly comprises a magnetic ring disposed about the first Faraday rotator, the optical splitting sheet, and the second Faraday rotator.

5. The device of claim 4, wherein the intermediate assembly comprises first and second lenses having the first Faraday rotator, the optical splitting sheet, and the second Faraday rotator disposed therebetween.

6. The device of claim 5, wherein the first lens and the second lens comprise C lenses and/or lenses having focal planes on two sides configured to focalize and collimate light of the optical beam; wherein the input and the first output/input are located on one focal plane of the first lens; wherein an optical splitting face of the optical splitting sheet is located on another focal plane of the first lens; wherein the second output/input is located on one focal plane of the second lens; and wherein the optical splitting face of the optical splitting sheet is located on another focal plane of the second lens.

7. The device of claim 5, wherein the magneto-optical crystals of the first Faraday rotator and the second Faraday rotator each comprise a rotation angle of 22.5-degrees for a polarization direction of linear polarized light; wherein the first lens and the second lens have a same dimension and material; and wherein the input rotation device, the first output rotation device, and the second output rotation device have substantially same dimensions.

8. The device of claim 5, wherein the magnetic ring comprises a permanent magnet configured to provide a saturated magnetic field strength of the magneto-optical crystals, causing the magneto-optical crystals to have fixed rotation of a polarization direction of a linear polarized light; wherein the magnetic field direction is parallel to the light propagation direction; and wherein the device is configured such that the polarization direction is rotated clockwise for the linear polarized light incoming from an N pole of the magnetic field and such that the polarization direction is rotated counterclockwise for the linear polarized light incoming from an S pole of the magnetic field.

9. The device of claim 8, wherein the input is configured to pass the light of the optical beam, incident at the input, to the optical splitting sheet; wherein the optical splitting sheet is configured to split the light incident thereto into the reflected light portion as reflected light and the transmitted light portion as transmitted light; wherein the first output/input is configured to pass the reflected light; and wherein the second output/input is configured to pass the transmitted light.

10. The device of claim 9, wherein the device is configured to optically isolate the first reverse light of the optical beam, incident at the first output/input, from the input and the second output/input.

11. The device of claim 9, wherein the device is configured to optically isolate the second reverse light of the optical beam, incident at the second output/input, from the input and the first output/input.

12. The device of claim 1, wherein the input comprises an input fiber optically coupled to the input birefringent device; wherein the first output/input comprises a first output fiber optically coupled to the first output birefringent device; and wherein the second output/input comprises a second output fiber optically coupled to the second output birefringent device.

13. The device of claim 12, comprising a first dual-fiber head having the input fiber and the first output fiber disposed therein, the first output fiber and the input fiber being symmetric with respect to a central axis of the first dual-fiber head, the first output fiber and the second output fiber both being located on the same side of the central axis.

14. The device of claim 13, comprising a second dual-fiber head having the second output fiber disposed therein and having a pitched hole, the second dual-fiber head being the same as the first dual-fiber head.

15. The device of claim 1, wherein the input birefringent device is fixed on an end face of an optical fiber for the input; and wherein the input rotation device is fixed on the input birefringent device.

16. The device of claim 1, wherein the first output birefringent device is fixed on an end face of an optical fiber for the first output/input; and the first output rotation device is fixed on the first output birefringent device.

17. The device of claim 1, wherein the second output birefringent device is fixed on an end face of an optical fiber for the second output/input; and wherein the second output rotation device is fixed on the second output birefringent device.

18. The device of claim 1, wherein at least one of the input, first output/input, and second output birefringent devices comprises a displacement-type birefringent crystal and is configured to split/combine o-light and e-light inside the birefringent crystal.

19. The device of claim 18, wherein the birefringent crystal comprises an optical axis intersecting obliquely with a surface of the birefringent crystal at an angle of 45-degrees, the optical axis having a splitting direction of the o-light and the e-light that is perpendicular to a beam propagation direction and that is parallel to a direction of relative displacement between the input and the first output/input and the second output/input.

20. The device of claim 1,
wherein: the input birefringent device and the first output birefringent device have parallel optical axes; and a combination of the input rotation device, the first output rotation device, and the first intermediate rotation device produce a 90-degree rotation angle;
wherein: the input birefringent device and the first output birefringent device have perpendicular optical axes; and a combination of the input rotation device, the first output rotation device, and the first intermediate rotation device produce a 0-degree rotation angle;
wherein: the input birefringent device and the second output splitting/combining device have parallel optical axes; and a combination of the input optical rotation device, the second output optical rotation device, and the second intermediate rotation device produce a 0-degree rotation angle; or
wherein: the input birefringent device and the second output birefringent device have parallel optical axes; and a combination of the input optical rotation device, the second output optical rotation device, and the second intermediate rotation device produce a 90 degree rotation angle.

21. The device of claim 1, wherein the input rotation device, the first output rotation device, and the second output rotation device each comprises a ½ wavelength (A) phase delay-type crystalline quartz waveplate configured to rotate a polarization direction of a linear polarized light; wherein a combination of the input rotation device and the first output rotation device are configured to produce an optical rotation angle of 45-degrees; and wherein a combination of the input rotation device and the second output rotation device are configured to produce an optical rotation angle of 45-degrees.

22. An optical device for an optical beam, the device comprising:
- an input, for the optical beam, having: an input birefringent device, an input fiber optically coupled to the input birefringent device, and an input rotation device optically coupled to the input birefringent device;
- a first output/input, for a first portion of the optical beam, having: a first output birefringent device, a first output fiber optically coupled to the first output birefringent device, and a first output rotation device optically coupled to the first output birefringent device;
- a second output/input, for a second portion of the optical beam, having: a second output birefringent device, a second output fiber optically coupled to the second output birefringent device, and a second output rotation device optically coupled to the second output birefringent device;
- a first dual-fiber head having the input fiber and the first output fiber disposed therein, the first output fiber and the input fiber being symmetric with respect to a central axis of the first dual-fiber head, the first output fiber and the second output fiber both being located on the same side of the central axis; and
- an intermediate assembly having: a first intermediate rotation device optically coupled to the input rotation device and the first output rotation device, a second intermediate rotation device optically coupled to the second output rotation device, and a splitter optically coupled between the first and second intermediate rotation devices,
- wherein: the input birefringent device and the first output birefringent device have parallel optical axes; and a combination of the input rotation device, the first output rotation device, and the first intermediate rotation device produce a 90-degree rotation angle; or
- wherein: the input birefringent device and the first output birefringent device have perpendicular optical axes; and a combination of the input rotation device, the first output rotation device, and the first intermediate rotation device produce a 0-degree rotation angle.

23. An optical device for an optical beam, the device comprising:
- an input, for the optical beam, having: an input birefringent device, an input fiber optically coupled to the input birefringent device, and an input rotation device optically coupled to the input birefringent device;
- a first output/input, for a first portion of the optical beam, having: a first output birefringent device, a first output fiber optically coupled to the first output birefringent device, and a first output rotation device optically coupled to the first output birefringent device;
- a second output/input, for a second portion of the optical beam, having: a second output birefringent device, a second output fiber optically coupled to the second output birefringent device, and a second output rotation device optically coupled to the second output birefringent device;
- a first dual-fiber head having the input fiber and the first output fiber disposed therein, the first output fiber and the input fiber being symmetric with respect to a central axis of the first dual-fiber head, the first output fiber and the second output fiber both being located on the same side of the central axis; and
- an intermediate assembly having: a first intermediate rotation device optically coupled to the input rotation device and the first output rotation device, a second intermediate rotation device optically coupled to the second output rotation device, and a splitter optically coupled between the first and second intermediate rotation devices,
- wherein the input birefringent device and the second output birefringent device have parallel optical axes; and
- wherein a combination of the input optical rotation device, the second output optical rotation device, and the second intermediate rotation device produce a 0-degree rotation angle or a 90 degree rotation angle.

* * * * *